United States Patent [19]

Lalo

[11] Patent Number: 5,233,938
[45] Date of Patent: Aug. 10, 1993

[54] VEHICLE FLAG SYSTEM

[75] Inventor: Abraham Lalo, Hallandale, Fla.

[73] Assignee: Auto Flag Inc., Hollywood, Fla.

[21] Appl. No.: 980,267

[22] Filed: Nov. 23, 1992

[51] Int. Cl.⁵ .................................................. G09F 17/00
[52] U.S. Cl. .................................. 116/173; 116/28 R; 248/539
[58] Field of Search .............. 116/28 R, 173; 40/591; 403/381; 248/539; 52/110, 40

[56] References Cited

U.S. PATENT DOCUMENTS

| | | | |
|---|---|---|---|
| 233,933 | 11/1880 | Jacobs | 248/539 |
| 1,296,072 | 3/1919 | Gillespie | 248/539 |
| 2,665,103 | 1/1954 | Flora et al. | 248/539 X |
| 2,764,122 | 9/1956 | Irvin | 116/173 |
| 3,260,486 | 7/1966 | Groff | 248/539 |
| 3,715,821 | 2/1973 | Hawes . | |
| 3,762,360 | 10/1973 | Hawes . | |
| 4,015,557 | 4/1977 | Schulein . | |
| 4,348,978 | 9/1982 | Brucato . | |
| 4,471,873 | 9/1984 | Thomas . | |
| 4,550,230 | 10/1985 | Johnson | 403/381 X |
| 4,685,751 | 8/1987 | Dupree | 403/381 |
| 4,833,443 | 5/1989 | Siew . | |
| 4,976,410 | 12/1990 | Tomaiuolo . | |
| 4,986,209 | 1/1991 | Spica . | |
| 5,042,418 | 8/1991 | Hoover . | |
| 5,089,803 | 2/1992 | Bohn . | |

Primary Examiner—Daniel M. Yasich
Attorney, Agent, or Firm—Natter & Natter

[57] ABSTRACT

A vehicle flag system includes a flag, a flag mast and a window mount. The flag mast includes a base configured to be lockingly received in a socket formed in the window mount. The mast base is formed with an axial tenon which mates with a mortise formed in the socket. A pair of spring legs project from the base parallel to the tenon and each is received within a channel formed in the socket. The spring legs include enlarged latches at their ends and the spring legs are compressed toward to the tenon when the tenon is inserted into the mortise. When the tenon seats fully in the mortise, the latches register with cut out portions of the socket wall and spring outwardly. To release the base from the socket, the latches are manually compressed toward the tenon.

15 Claims, 2 Drawing Sheets

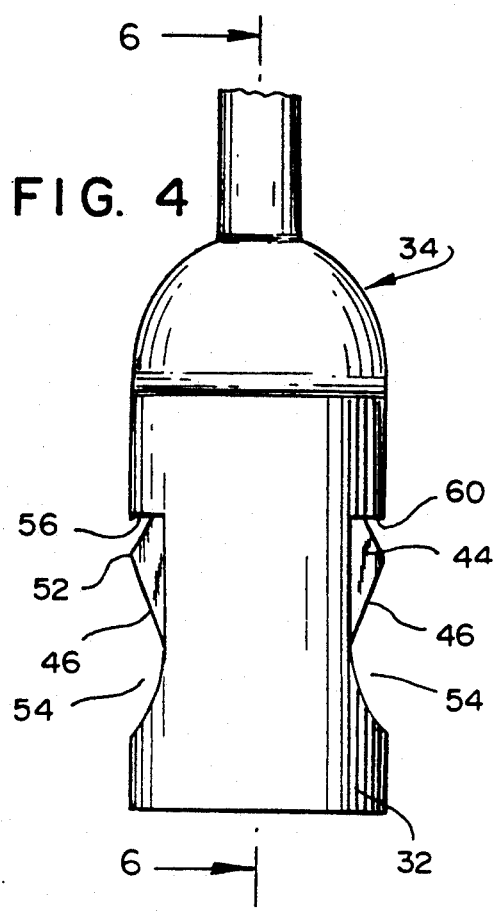
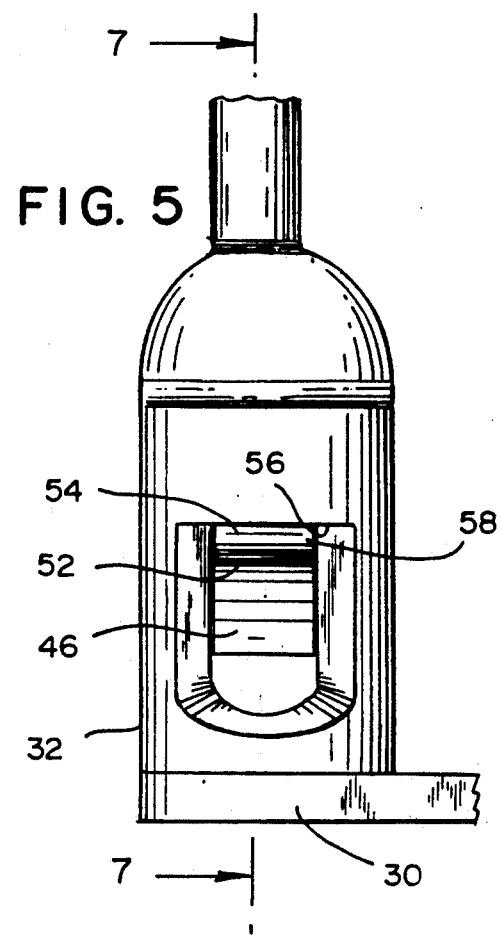
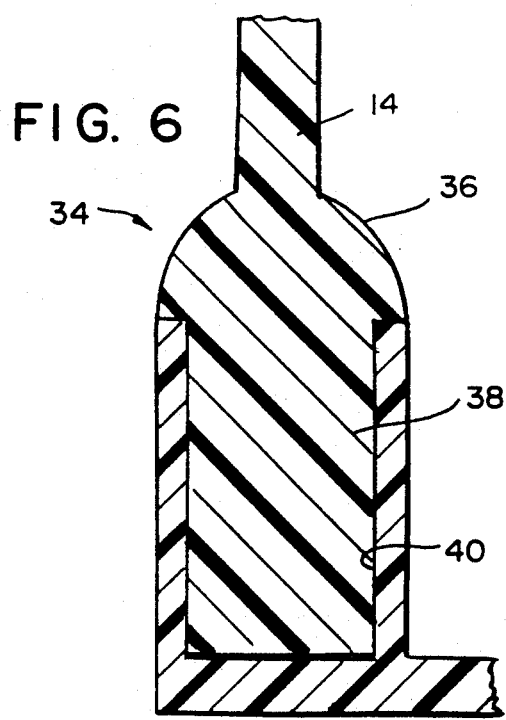
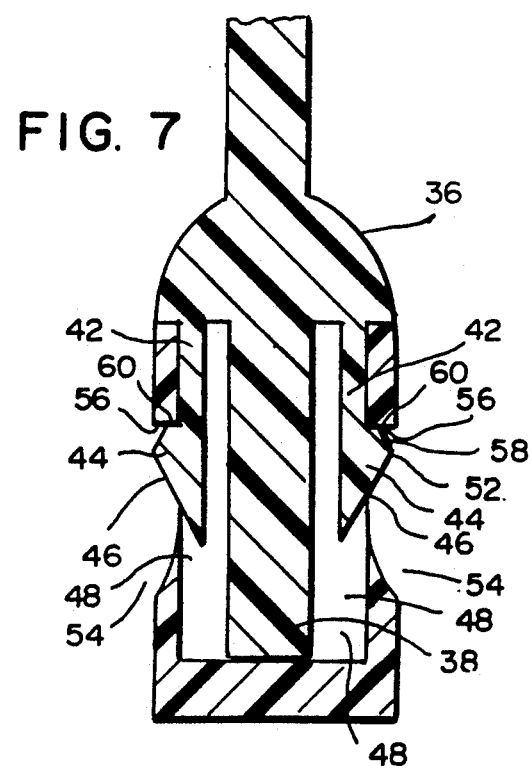

VEHICLE FLAG SYSTEM

BACKGROUND OF THE INVENTION

1. Field of the Invention

This invention relates generally to flags and more particularly to a system for displaying a flag from a vertically adjustable vehicle window.

2. Related History

For centuries, flags have comprised annunciators which indicated loyalty, devotion, patriotism, national origin and the like and also functioned as message conveyors. In connection with motor vehicles, the use of flags as an annunciation device possibly dates to the origin of the horseless carriage. In the more recent past, flags have been employed in conjunction with motor vehicles for conveying distress signals with respect to disabled vehicles, for promoting sales and or rentals, as for example, in car lots, for distinguishing one's car from others in parking lots, and for the traditional purposes of indicating patriotism, national origin, etc. as usually displayed on slow moving vehicles in motorcades and parades.

It has been found, however, that systems employed for attaching flags to motor vehicles for use as a distress signal or for use in promoting the sale of a vehicle, were not suitable to withstand the rigors of on road usage at normal vehicle travel speeds. In such instances, significant bending and torsional moments were generated by wind forces and mounting arrangements configured for particular non-moving applications were unsuitable.

SUMMARY OF THE INVENTION

A vehicle flag system includes a flag carried on a mast which is removably supported from a vertically movable vehicle side window. A window mount having a U-shaped clip seats over the top edge of the vehicle window and carries a socket within which a base of the flag mast is seated.

The base includes an axial tenon which is received within a mating mortise formed in the socket for securely anchoring the mast to withstand torsional and bending moments generated by wind forces when the vehicle is moving.

In order to lock the tenon in the mortise, a pair of spring legs project from the base and extend parallel to the tenon. Each leg includes a transverse outwardly projecting latch at its end. The socket includes a pair of opposed channels which open into the mortise and which accommodate the spring legs. As the tenon is inserted into the mortise, the latches engage the socket wall to bend the spring legs toward the tenon. When the tenon seats fully in the mortise, the latches register with cut out portions of the socket wall. The latches then spring outwardly with their upper shoulders locking against a top shoulder of each cut out portion.

The latches are accessible from the socket wall cut outs and are manually deflected to clear the shoulder of their respective cut out portions when the flag mast is to be disengaged from the window mount.

From the foregoing compendium, it will be appreciated that it is an aspect of the present invention to provide a vehicle flag system of the general character described which is not subject to the disadvantages of the related history aforementioned.

It is a feature of the present invention to provide a vehicle flag system of the general character described which is capable of displaying a flag from a vehicle which travels at normal speeds.

A consideration of the present invention is to provide a vehicle flag system of the general character described which includes a window mount configured to lockingly engage a flag mast.

A further consideration of the present invention is to provide a vehicle flag system of the general character described which is relatively low in cost and suitable for economical mass production fabrication.

Another feature of the present invention is to provide a vehicle flag system of the general character described which is well suited for diverse applications, such as locating a vehicle in a parking lot, promoting the sale or rental of a vehicle, advising of a distress condition and usage at normal vehicle travel speeds.

To provide a vehicle flag system of the general character described which is simple to install and use is yet a further consideration of the present invention.

Another feature of the present invention is to provide a vehicle flag system of the general character described which includes a window mount which may permanently attach to a vehicle window regardless of whether or not a flag is being displayed and which will not detract from conventional window usage.

Other aspects, features and considerations in part will be obvious and in part will be pointed out hereinafter.

With these ends in view, the invention finds embodiment in various combinations of elements, arrangements of parts and series of steps by which the said invention is achieved, all with reference to the accompanying drawings and the scope of which is more particularly pointed out and indicated in the appended claims.

BRIEF DESCRIPTION OF THE DRAWINGS

Referring now in detail to the drawings, wherein one of the various possible exemplary embodiments of the invention is shown.

FIG. 4 is an enlarged scale fragmentary front elevational view of the vehicle flag system with portions deleted for clarity and showing a base of the mast engaged in the socket;

FIG. 5 is an enlarged scale fragmentary side elevational view of the base and the socket;

FIG. 6 is an enlarged scale fragmentary sectional view through the base and the socket, the same being taken substantially along the plane 6—6 of FIG. 4 and showing a tenon which is seated in the mortise; and FIG. 7 is an enlarged scale fragmentary sectional view through the base and the socket, the same being taken substantially along the plane 7—7 of FIG. 5 and showing a pair of parallel spring legs which extend from the base seated in the channels and with an outwardly projecting latch of each leg engaging a cut out portion of the socket wall for locking the mast to the mount.

DESCRIPTION OF THE PREFERRED EMBODIMENT

Figure 1:
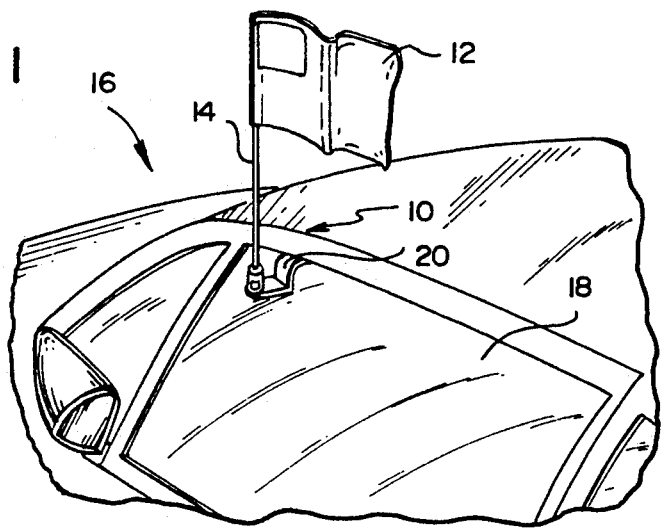
FIG. 1 is a perspective fragmentary illustration of an automobile showing a vehicle flag system constructed in accordance with and embodying the invention and including a flag and flag mast secured to a window mount having a socket.

Referring now in detail to the drawings, the reference numeral 10 denotes generally a vehicle flag system constructed in accordance with and embodying the invention. The flag system 10 is adopted to display a flag 12 affixed to a mast 14 adjacent the upper end of the mast 14. The flag mast 14 is mounted to a motor vehicle 16 and more particularly, a vertically adjustable side window 18 of the vehicle 16.

The vehicle flag system 10 includes, in addition to the flag 12 and the mast 14, a window mount, denoted generally by the reference numeral 20. From an examination of FIGS. 2 and 3 wherein the window mount 20 is illustrated, it should be appreciated that the window mount 20 includes a generally U shaped clip portion 22 having a pair of generally planer panels, 24, 26 adapted to engage the inner and outer faces, respectively, of the window 18. The panels 24, 26 are joined along a common bight 28 with the distance between the panels 24, 26 being less than the thickness of the window 18 to assure a tight grip engagement with the window 18.

Figure 2:
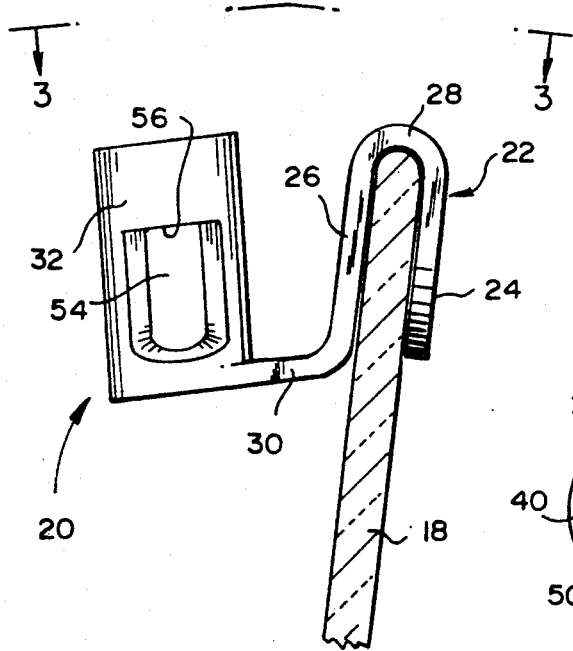
FIG. 2 is an enlarged scale side elevational view of the window mount and showing a vehicle window, in transverse section, with a U-shaped clip of the window mount secured over an upper edge of the window and engaging both the interior and exterior faces thereof.

The window mount 20 also includes a generally planar platform 30 which is integrally joined to the lower end of the panel 26. As illustrated in FIG. 2, the platform 30 preferably extends along a downwardly inclined plane for the purpose of accommodating curved or sloped, i.e. nonvertical, vehicle windows and mounting the flag 12 with its mast 14 directed in a substantially vertical position.

At the distal end of the platform 30 is a cylindrical socket 32 which projects upwardly at an angle perpendicular to the platform 30. In accordance with the invention, the socket 32 is configured to releasably engage the end of the mast opposite the flag, i.e. the free end. For such purpose, the free end of the mast 14 is configured with a base 34.

With reference now to FIGS. 6 and 7, it will be noted that the base 34 includes a transverse flange 36 which is generally hemispherical in configuration. Projecting in an axial direction from the flange 36 is tenon 38. The tenon 38 is dimensioned in noncircular, e.g. rectangular, transverse cross section and is snugly seated within an axial socket cavity configured as a mating mortise 40. The thickness of the socket wall and the thickness and length of the tenon are so dimensioned as to provide a highly stable interlock between the mast and the window mount so as to readily withstand bending and torsional forces which are exerted at the base 34 during operation of the vehicle 16 at legal driving speeds.

In order to releasably lock the tenon within the mortise, the base 34 includes a pair of spring legs 42 which extend downwardly from the flange 36, parallel to one another and parallel to the tenon 38. At the free end of each leg 42, a transversely projecting latch 44 is provided. The latch 44 includes and upwardly outwardly sloping lower face 46, at its distal end.

Figure 3:
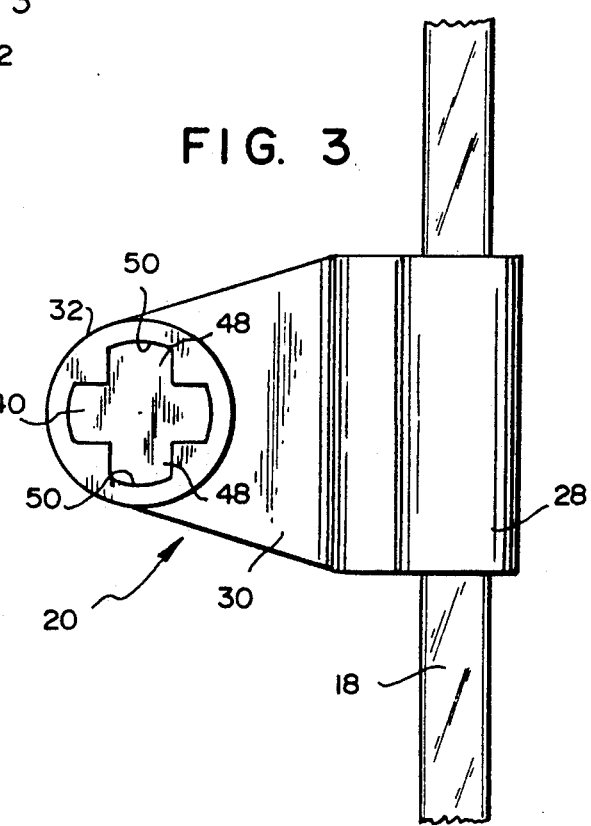
FIG. 3 is a top plan view of the window mount, the same being taken substantially along the broken plane 3—3 of FIG. 2 and showing a mortise and a pair of open channels formed within the socket.

To engage the base 34 in the socket 32, the mast and socket are axially aligned with the tenon 38 in registry with the mortise 40. In such position, the spring legs 42 are in registry with a pair of open channels 48 which extend into the socket 32 in a direction transverse to the mortise 40 and which open into the mortise 40, as illustrated in FIGS. 3 and 7. With attention directed FIG. 3 it will be observed that although the channels 48 cut significantly into the sides of the mortise 40, a sufficient thickness of corner areas 49 remain for engagement with the tenon 38.

As the tenon 38 is moved downwardly into the mortise 40, the sloped lower surfaces 46 of the latches engage portions 50 of the socket which define the radially outer wall of the channels 48. Further downward movement of the mast relative to the socket results in a camming action between the channel walls 50 and the latch surfaces 46 which cause the spring legs 42 to bend inwardly, toward the mortise 40 and into the open area of the channels which face the mortise, thereby accommodating the latches within the channels 48.

As the tenon 38 and spring legs 42 are inserted further into the socket, the latches 44 cause the spring legs to bend further inwardly until such point as a maximum thickness edge 52 of each latch engages the respective channel wall 50. When the tenon 38 is inserted further into the mortise, no further bending of the legs occurs until the maximum thickness edge 52 of each latch registers with a cut out 54 formed through the wall of the socket.

Each cut out 54 includes an upper shoulder 56. Once the edge 52 of each latch passes the shoulder 56, an inwardly sloping surface 58 of each latch engages the shoulder 56, and provides a camming force drawing the tenon into the mortise until the tenon fully seats in the mortise, at which point a shoulder 60 of each latch 44 registers with shoulder 56 and the spring legs snap outwardly, locking the base 34 in the socket.

To disengage the mast from the window mount 20, one merely grasps the cut outs 54 between the thumb and index finger and compresses the latches toward one another, bending their respective spring legs and disengaging the shoulders 60, 56 whereby, the mast base 34 may be pulled from the socket 32.

It should be appreciated that the mast and window mount are each preferably formed of one piece and may be injection molded of a suitable thermoplastic such as acrylonitrile—butadiene—styrene, polycarbonates, polyvinyl chloride, PPO, high density polyethylene and the like.

Thus it will be seen that there is provided a vehicle flag system which achieves the various aspects, features and considerations of the present invention and which is well suited to meet the conditions of practical usage.

As various changes might be made in the illustrative embodiment of the vehicle flag system herein disclosed without departing from the spirit of the invention, it is understood that all matter herein described or shown in the accompanying drawings is to be interpreted as illustrative and not in a limiting sense.

Having thus described the invention there is claimed as new and desired to be secured by Letters Patent:

1. A vehicle flag system for displaying a flag from a motor vehicle, the system comprising a flag, a flag mast and a mount, the flag being secured to the flag mast adjacent an upper end thereof, the mount including socket means for receiving the mast and means for attachment to a motor vehicle, the socket means being fixed to the mount, the means for attachment including means for fixing the mount to at least a portion of the motor vehicle, the socket means including a cavity, the cavity having a noncircular transverse cross section, the mast being configured at its lower end with a mating noncircular cross section, the mast cross section being dimensioned at its lower end to be received within the cavity, the lower end of the mast being snugly received in the cavity when the flag is displayed, whereby the mast is rotationally fixed with respect to the socket and torsional forces exerted on the mast are restrained.

2. A vehicle flag system as constructed in accordance with claim 1 further including means for retaining the lower end of the mast in the cavity.

3. A vehicle flag system as constructed in accordance with claim 2 wherein the means for retaining the lower end of the mast in the cavity comprises a spring latch, the socket including means for receiving the latch when the lower end of the mast is seated in the cavity, the latch being biased against the means for receiving the latch when the socket receives the mast.

4. A vehicle flag system as constructed in accordance with claim 3 wherein the means for retaining the lower end of the mast in the cavity includes a plurality of latches and the socket includes a like plurality of means for receiving the latches.

5. A vehicle flag system as constructed in accordance with claim 4 wherein the mast includes a longitudinal axis, the base includes a plurality of flexible legs, each leg extending substantially parallel to the mast axis, each latch being positioned at the end of one of the legs, the socket including a like plurality of channels, each channel being configured to receive one of the legs, one of the means for receiving the latches being associated with each channel.

6. A vehicle flag system as constructed in accordance with claim 1 wherein the means for attachment to a motor vehicle comprises means for engaging a vertically adjustable vehicle window.

7. A vehicle flag system as constructed in accordance with claim 6 wherein the means for engaging a vertically adjustable vehicle window comprises a U-shaped clip, the clip having a pair of substantially parallel panels for engagement with opposite faces of a vehicle window.

8. A vehicle flag system as constructed in accordance with claim 7 wherein the means for attachment to a motor vehicle includes a platform, the platform interconnecting the socket and the U-shaped clip, the socket, the platform and the clip being formed of one piece molded construction.

9. A vehicle flag system as constructed in accordance with claim 1 wherein the mast includes a longitudinal axis, the socket includes a longitudinal axis, the mast axis being coaxial with the socket axis when the lower end of the mast is received within the cavity.

10. A vehicle flag system as constructed in accordance with claim 1 wherein the mount is formed of one piece molded thermoplastic.

11. A vehicle flag system for displaying a flag from a motor vehicle, the system comprising a flag, a flag mast and a mount, the flag being secured to the flag mast adjacent one end thereof, the flag mast including a base adjacent the other end thereof, the mount including means for receiving the base and means for attachment to a motor vehicle, the means for receiving the base including a socket, the base including latch means for releasably locking the base in the socket, the latch means including a projection, the socket including means for receiving the projection when the base is received in the socket, whereby engagement between the projection and the means for receiving the projection precludes disengagement of the flag mast from the mount without releasing the latch means.

12. A vehicle flag system for displaying a flag from a motor vehicle as constructed in accordance with claim 11 wherein the base includes a plurality of latch means, each having a projection and the socket includes means for receiving each projection when the base is received in the socket.

13. A vehicle flag system as constructed in accordance with claim 4 wherein the means for receiving the projection comprises a cut away portion of the socket which extends through a wall of the socket whereby the projection is externally accessible for manual release of the latch and removal of the base from the socket.

14. A vehicle flag system for displaying a flag from a motor vehicle, the system comprising a flag, a flag mast and a mount, the flag being secured to the flag mast adjacent one end of the mast, the flag mast including a base adjacent the other end thereof, the mount including means for engaging the base and means for attachment to a motor vehicle, the means for engaging the base including a socket, the socket including a cavity, the cavity being dimensioned to accommodate the base, the socket further including a channel, the base including a leg dimensioned to be received within the channel, the leg including laterally projecting latch means for releasably locking the base to the socket when the base is seated in the cavity, the channel including means for releasably receiving the latch means when the base is seated in the cavity, the engagement between the latch means and the means for receiving the latch means serving to prevent disengagement between the base and the socket when the base is seated in the cavity.

15. A vehicle flag system for displaying a flag from a motor vehicle as constructed in accordance with claim 14 wherein the base include a plurality of legs, each leg having laterally projecting latch means and the socket includes a like plurality of channels, each channel having means for receiving the latch means, each of the channels having an open side facing the cavity.

* * * * *